United States Patent
Deppe

(10) Patent No.: US 8,847,497 B2
(45) Date of Patent: Sep. 30, 2014

(54) DRIVING MODES FOR LIGHT CIRCUITS

(75) Inventor: Carsten Deppe, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 132 days.

(21) Appl. No.: 13/512,414

(22) PCT Filed: Dec. 1, 2010

(86) PCT No.: PCT/IB2010/055518
§ 371 (c)(1),
(2), (4) Date: May 29, 2012

(87) PCT Pub. No.: WO2011/070482
PCT Pub. Date: Jun. 16, 2011

(65) Prior Publication Data
US 2013/0063033 A1 Mar. 14, 2013

(30) Foreign Application Priority Data
Dec. 11, 2009 (EP) ..................................... 09178919

(51) Int. Cl.
*H05B 37/02* (2006.01)
*H05B 39/00* (2006.01)
*H05B 37/00* (2006.01)
*H05B 33/08* (2006.01)

(52) U.S. Cl.
CPC .......... *H05B 33/083* (2013.01); *H05B 33/0809* (2013.01)
USPC .............................. 315/121; 315/312; 315/91

(58) Field of Classification Search
CPC ....................................................... H05B 37/02
USPC .................... 315/82, 295, 312, 161, 294, 192
See application file for complete search history.

(56) References Cited

U.S. PATENT DOCUMENTS

| 5,663,719 | A | 9/1997 | Deese et al. | |
|---|---|---|---|---|
| 7,081,722 | B1 | 7/2006 | Huynh et al. | |
| 8,410,720 | B2 * | 4/2013 | Holec et al. | 315/294 |
| 8,598,796 | B2 * | 12/2013 | Jeong | 315/192 |
| 2002/0175826 | A1 | 11/2002 | Hutchison et al. | |
| 2004/0233145 | A1 | 11/2004 | Chiang | |

(Continued)

FOREIGN PATENT DOCUMENTS

EP 1318701 A2 11/2002

OTHER PUBLICATIONS

Author: Pang, GHK; Chan, CH; Kwan, TTO, Title: Tricolor Light-emitting diode dot matrix display system with audio output, Title Date; Apr. 2001.*

*Primary Examiner* — Douglas W Owens
*Assistant Examiner* — Wei Chan
(74) *Attorney, Agent, or Firm* — Yuliya Mathis

(57) ABSTRACT

Driver circuits (1) for driving load circuits (2) comprising first and second light circuits (21-22, 71-72) are in first/second modes for input voltages having first/second voltage amplitudes, the second voltage amplitudes being larger than the first voltage amplitudes. The first light circuits (21, 71) are on in the first and second modes. The second light circuits (22, 72) are off in the first modes and are on in the second modes. A control circuit (21, 71) in dependence of the modes to extend control. These currents may get smaller current amplitudes in higher modes. Light outputs of the first light circuit (21, 71) may get smaller in higher modes. A total light output of all light circuits (21-22, 71-72) may remain substantially constant during all modes.

20 Claims, 5 Drawing Sheets

(56) References Cited

U.S. PATENT DOCUMENTS

| | | | |
|---|---|---|---|
| 2006/0208669 A1* | 9/2006 | Huynh et al. | 315/312 |
| 2006/0256050 A1* | 11/2006 | Ikeda | 345/82 |
| 2008/0191642 A1* | 8/2008 | Slot et al. | 315/295 |
| 2012/0200228 A1* | 8/2012 | Fujita | 315/161 |

* cited by examiner

DRIVING MODES FOR LIGHT CIRCUITS

FIELD OF THE INVENTION

The invention relates to a driver circuit for driving a load circuit, the load circuit comprising a first light circuit and a second light circuit. The invention further relates to a device comprising such a driver circuit and further comprising a load circuit, and to a method for driving a load circuit via such a driver circuit.

Examples of such a light circuit are light emitting diode circuits. Examples of such a device are lamps. The first and second light circuits may be different light circuits or may be different segments of one and the same light circuit.

BACKGROUND OF THE INVENTION

U.S. Pat. No. 7,081,722 describes a light emitting diode multiphase driver circuit with phase switches. This driver circuit has a relatively limited control.

SUMMARY OF THE INVENTION

It is an object of the invention to provide a driver circuit for driving a load circuit, the load circuit comprising a first light circuit and a second light circuit, wherein the driver circuit has a relatively extended control. Further objects of the invention are to provide a device comprising a driver circuit and further comprising a load circuit, and a method for driving a load circuit via a driver circuit, with a relatively extended control.

According to a first aspect of the invention, a driver circuit is provided for driving a load circuit, the load circuit comprising a first light circuit and a second light circuit, the driver circuit being in a first mode for an input voltage having a first voltage amplitude, the driver circuit being in a second mode for the input voltage having a second voltage amplitude larger than the first voltage amplitude, the first light circuit being activated in the first mode and being activated in the second mode, the second light circuit being de-activated in the first mode and being activated in the second mode, the driver circuit comprising
    a control circuit for controlling an amplitude of a current flowing through at least the first light circuit in dependence of the first and second modes.

In a first mode, an input voltage supplied to a combination of the driver circuit and the load circuit has a first voltage amplitude (or has a voltage amplitude selected from a first group of voltage amplitudes or has a voltage amplitude within a first range). In a second mode, the input voltage has a second voltage amplitude (or has a voltage amplitude selected from a second group of voltage amplitudes or has a voltage amplitude within a second range). The second voltage amplitude (or the voltage amplitude selected from the second group of voltage amplitudes or the voltage amplitude within the second range) is larger than the first voltage amplitude (or the voltage amplitude selected from the first group of voltage amplitudes or the voltage amplitude within the first range). The first light circuit is activated in the first mode and is activated in the second mode, in other words the first light circuit provides light in the first and second modes. The second light circuit is de-activated in the first mode and is activated in the second mode, in other words the second light circuit provides light in the second mode, but not in the first mode.

By having provided the driver circuit with a control circuit for controlling an amplitude of a current flowing through at least the first light circuit in dependence of the first and second modes, the light produced by the first light circuit can be controlled per mode. Such a driver circuit has a relatively extended control.

The input voltage is for example a rectified and smoothed alternating-current voltage. Each light circuit for example comprises one or more light emitting diodes or one or more segments of a light emitting diode (group).

According to an embodiment, the driver circuit is defined by the current in the first mode having a first current amplitude and the current in the second mode having a second current amplitude smaller than the first current amplitude. In the first mode, a large current flows through the first light circuit. In the second mode, a smaller current flows through the first light circuit, and for example also flows through the second light circuit. This way, fluctuations in a total power consumption are reduced.

According to an embodiment, the driver circuit is defined by the first light circuit in the first mode having a first light output and the first light circuit in the second mode having a second light output smaller than the first light output. In the first mode, the first light circuit provides a large light output. In the second mode, the first light circuit provides a smaller light output, and the second light circuit for example also provides such a smaller light output. This way, fluctuations in a total light output are reduced.

According to an embodiment, the driver circuit is defined by the control circuit comprising
    a first controlling circuit for in the first mode allowing the current with the first current amplitude to flow through the first light circuit, the first controlling circuit being de-activated in the second mode, and
    a second controlling circuit for in the second mode allowing the current with the second current amplitude to flow through the first and second light circuits, the second controlling circuit being de-activated in the first mode.

The first controlling circuit for example comprises one or two transistors and a first resistor for defining the current with the first current amplitude. The second controlling circuit for example comprises one or two transistors and a second resistor for defining the current with the second current amplitude. Each controlling circuit may be activated by another circuit or may be activated owing to the fact that a(n input) voltage has got a sufficiently large amplitude. Each controlling circuit may be de-activated by another circuit or may be de-activated owing to the fact that a(n input) voltage has got a too small amplitude. So, a de-activation of a controlling circuit includes a situation in which this controlling circuit stops functioning as a result of an insufficient (input) voltage.

According to an embodiment, the driver circuit is defined by further comprising
    a dimming circuit coupled to the first and second controlling circuits via resistors for dimming the activated light circuits.

The first and second controlling circuits allow a dimming circuit to be introduced easily.

According to an embodiment, the driver circuit is defined by the control circuit comprising
    a third controlling circuit for in the first mode allowing the current with the first current amplitude to flow through the first light circuit and for in the second mode allowing the current with the second current amplitude to flow through the first and second light circuits, and
    a fourth controlling circuit for short-circuiting the second light circuit in the first mode. The third controlling circuit controls the current with the first current amplitude in the first mode and controls the current with the second current amplitude in the second mode. The fourth controlling circuit defines the light circuit/light circuits per mode that receives/receive the current by short-circuiting or bridging the other light circuit or light circuits.

According to an embodiment, the driver circuit is defined by the third controlling circuit comprising a current source and a current shaper coupled to each other. The current source and the current shaper produce the current with the first current amplitude in the first mode and produce the current with the second current amplitude in the second mode.

According to an embodiment, the driver circuit is defined by the load circuit further comprising a third light circuit, the driver circuit being in a third mode for the input voltage having a third voltage amplitude larger than the first and second voltage amplitudes, the first light circuit being activated in the third mode, the second light circuit being activated in the third mode, the third light circuit being de-activated in the first and second modes and being activated in the third mode, and the control circuit being arranged for controlling an amplitude of a further current flowing through at least the first and second light circuits in dependence of the second and third modes. Further light circuits such as fourth to n-th light circuits and further modes such as fourth to n-th modes are not to be excluded.

According to an embodiment, the driver circuit is defined by the further current in the second mode having a third current amplitude and the further current in the third mode having a fourth current amplitude smaller than the third current amplitude. This way, fluctuations in a total power consumption are reduced in case of three light circuits being used.

According to an embodiment, the driver circuit is defined by the first light circuit in the second mode having a third light output and the first light circuit in the third mode having a fourth light output smaller than the third light output, and/or the second light circuit in the second mode having a fifth light output and the second light circuit in the third mode having a sixth light output smaller than the fifth light output. This way, fluctuations in a total light output are reduced in case of three light circuits being used. These fluctuations may be further reduced by properly located capacitors.

According to an embodiment, the driver circuit is defined by a total light output of all light circuits being substantially constant during all modes. Substantially constant here means at least less fluctuations in the total light output compared to the prior art (U.S. Pat. No. 7,081,722).

According to a second aspect of the invention, a device is provided comprising the driver circuit as defined above and further comprising the load circuit.

According to a third aspect of the invention, a method is provided for driving a load circuit via a driver circuit, the load circuit comprising a first light circuit and a second light circuit, the driver circuit being in a first mode for an input voltage having a first voltage amplitude, the driver circuit being in a second mode for the input voltage having a second voltage amplitude larger than the first voltage amplitude, the first light circuit being activated in the first mode and being activated in the second mode, the second light circuit being de-activated in the first mode and being activated in the second mode, the method comprising a step of controlling an amplitude of a current flowing through at least the first light circuit in dependence of the first and second modes.

The invention is based on an insight that a driver circuit should have a relatively extended control. The invention is based on a basic idea that light produced by at least one of at least two light circuits should be controlled per mode.

The invention has solved a problem to provide a driver circuit for driving a load circuit, the load circuit comprising a first light circuit and a second light circuit, wherein the driver circuit has a relatively extended control. The invention is further advantageous in that a relatively extended control increases a number of options.

These and other aspects of the invention are apparent from and will be elucidated with reference to the embodiment(s) described hereinafter.

DETAILED DESCRIPTION OF EMBODIMENTS

Figure 1:
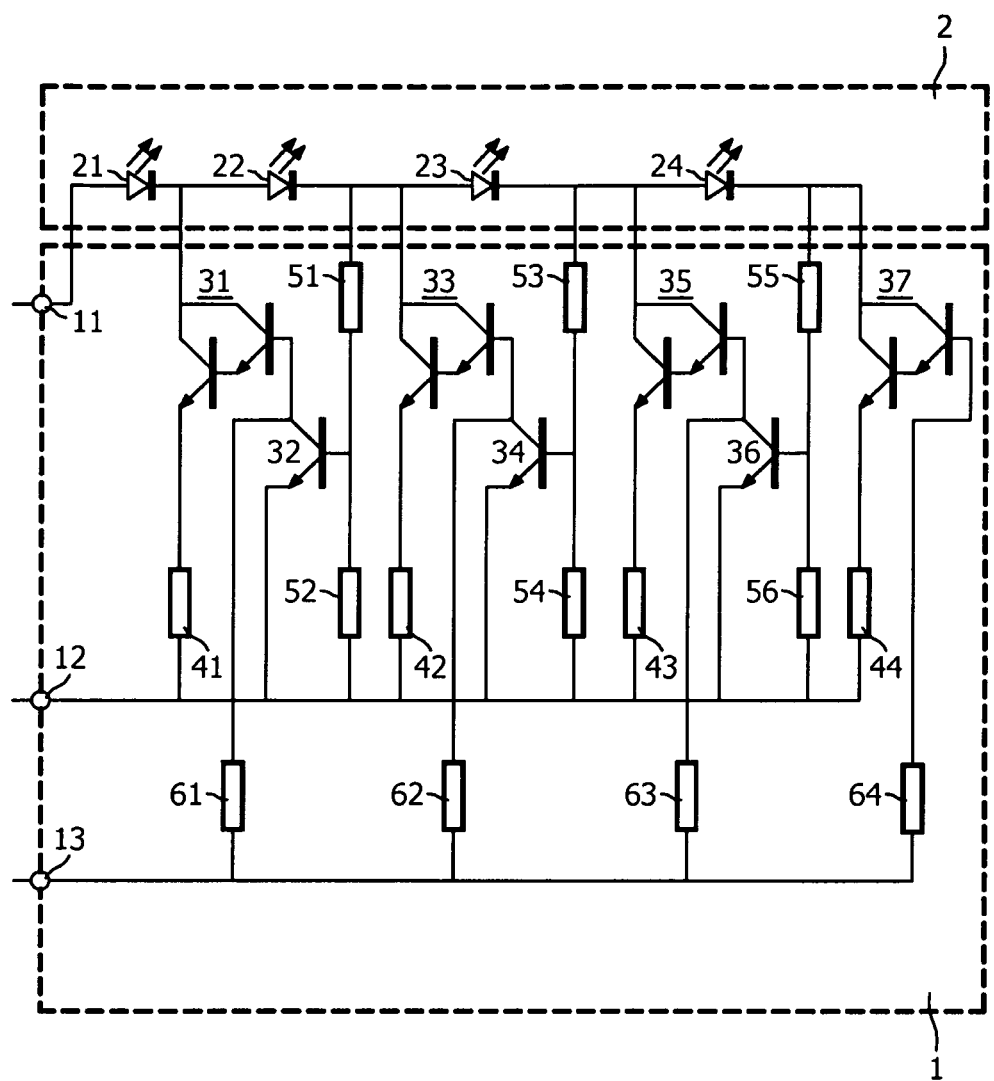
FIG. 1 shows a first embodiment of a driver circuit.

In the FIG. 1, a first embodiment of a driver circuit 1 for driving a load circuit 2 is shown. The driver circuit 1 for example comprises an input terminal 11 coupled to a positive side of a first light circuit 21 of the load circuit 2. Via the input terminal 11, an input voltage originating from a source not shown is supplied to a combination of the driver circuit 1 and the load circuit 2. A negative side of the first light circuit 21 is coupled to a positive side of a second light circuit 22 of the load circuit 2 and is coupled to a first main electrode of a Darlington configuration 31 of two transistors. A second main electrode of the Darlington configuration 31 is coupled via a resistor 41 to a ground terminal 12. A control electrode of the Darlington configuration 31 is coupled to a first main electrode of a transistor 32 and is coupled via a resistor 61 to a dimming terminal 13. A second main electrode of the transistor 32 is coupled to the ground terminal 12. A control electrode of the transistor 32 is coupled via a resistor 51 to a negative side of the second light circuit 22 and is coupled via a resistor 52 to the ground terminal 12.

The negative side of the second light circuit 22 is coupled to a positive side of a third light circuit 23 of the load circuit 2 and is coupled to a first main electrode of a Darlington configuration 33 of two transistors. A second main electrode of the Darlington configuration 33 is coupled via a resistor 42 to the ground terminal 12. A control electrode of the Darlington configuration 33 is coupled to a first main electrode of a transistor 34 and is coupled via a resistor 62 to the dimming terminal 13. A second main electrode of the transistor 34 is coupled to the ground terminal 12. A control electrode of the transistor 34 is coupled via a resistor 53 to a negative side of the third light circuit 23 and is coupled via a resistor 54 to the ground terminal 12.

The negative side of the third light circuit 23 is coupled to a positive side of a fourth light circuit 24 of the load circuit 2 and is coupled to a first main electrode of a Darlington configuration 35 of two transistors. A second main electrode of the Darlington configuration 35 is coupled via a resistor 43 to the ground terminal 12. A control electrode of the Darlington configuration 35 is coupled to a first main electrode of a transistor 36 and is coupled via a resistor 63 to the dimming terminal 13. A second main electrode of the transistor 36 is coupled to the ground terminal 12. A control electrode of the transistor 36 is coupled via a resistor 55 to a negative side of the fourth light circuit 24 and is coupled via a resistor 56 to the ground terminal 12.

The negative side of the fourth light circuit 24 is coupled to a first main electrode of a Darlington configuration 37 of two transistors. A second main electrode of the Darlington configuration 37 is coupled via a resistor 44 to the ground terminal 12. A control electrode of the Darlington configuration 37 is coupled via a resistor 64 to the dimming terminal 13.

Each light circuit for example comprises one or more light emitting diodes or one or more segments of a light emitting diode (group). The source not shown is for example an alternating-current voltage source coupled to a rectifier circuit and a capacitor circuit and a bleeder circuit. Each Darlington configuration may be replaced by a single transistor. Other transistors and other polarities and further circuits are not to be excluded. The capacitor circuit may be introduced for filtering purposes and/or for reducing light fluctuations.

This driver circuit 1 is in a first mode for the input voltage having a first voltage amplitude and is in a second mode for the input voltage having a second voltage amplitude larger than the first voltage amplitude and is in a third mode for the input voltage having a third voltage amplitude larger than the second voltage amplitude and is in a fourth mode for the input voltage having a fourth voltage amplitude larger than the third voltage amplitude. In the first mode, only the first light circuit 21 is on (activated) and the others are off (de-activated), in the second mode, only the first and second light circuits 21 and 22 are on (activated) and the others are off (de-activated), in the third mode, the first and second and third light circuits 21-23 are on (activated) and the light circuit 24 is off (de-activated), and in the fourth mode all are on (activated).

A control circuit comprising the elements 31-37 controls an amplitude of a current flowing through at least the first light circuit 21 in dependence of the modes. Preferably, in the first mode, the current has a largest current amplitude. In the second mode this current amplitude is a bit smaller, and in the third mode this current amplitude is yet smaller. In the fourth mode, the current has a smallest current amplitude. Preferably, in the first mode, a light output of the first light circuit 21 is largest. In the second mode this light output is a bit smaller, and in the third mode this light output is yet smaller. In the fourth mode, the light output is smallest. Most preferably, a total light output of all light circuits 21-24 is substantially constant during all modes.

The controlling circuit 31, 41 allows in the first mode a current with a first current amplitude to flow through the first light circuit 21 and is de-activated in the second mode by the transistor 32. The controlling circuit 33, 42 allows in the second mode a current with a second (smaller) current amplitude to flow through the first and second light circuits 21, 22 and is de-activated in the first mode owing to the fact that in the first mode the Darlington configuration 31 is conducting etc.

The resistors 61-64 and the dimming terminal 13 allow activated light circuits 21-24 to be dimmed. Thereto, a dimming circuit with for example a basic transistor circuit is to be coupled to the dimming terminal 13, such as for example a transistor for controlling a voltage present at the dimming terminal 13 or a transistor for controlling a current flowing through the dimming terminal 13.

Figure 2:
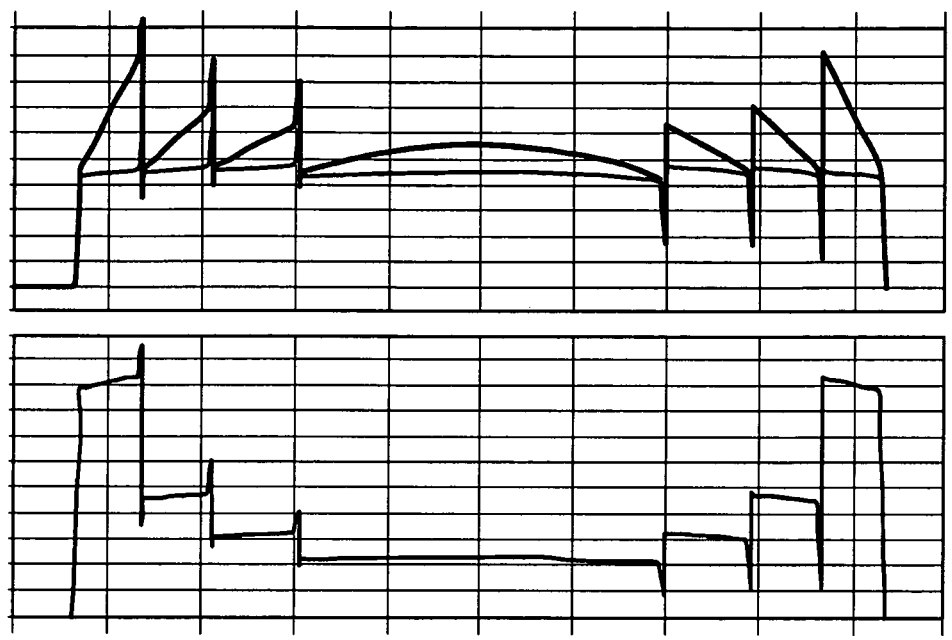
FIG. 2 shows first simulation results.

In the FIG. 2, first simulation results are shown. In the upper graph, the total input power (darker line) and the power (lighter line) of a string of light circuits 21-24 is shown for a first half of a cycle of a mains voltage. In the lower graph, the current flowing through the light circuit 21 of the string of light circuits 21-24 is shown for a first half of a cycle of a mains voltage.

Figure 3:
FIG. 3 shows second simulation results.

In the FIG. 3, second simulation results are shown, the total input power (lighter line) and the power (darker line) of the string of light circuits 21-24 for the driver circuit 1 and the load circuit 2 shown in the FIG. 1 when extended with a rectifier for rectifying a mains voltage and with an improved capacitor circuit for bridging voltage gaps and with a bleeder circuit. In that case, a flicker index of 4.43%, an efficiency of 78.7%, a power factor of 0.83 and a total harmonic distortion of 0.62 can be reached.

Figure 4:
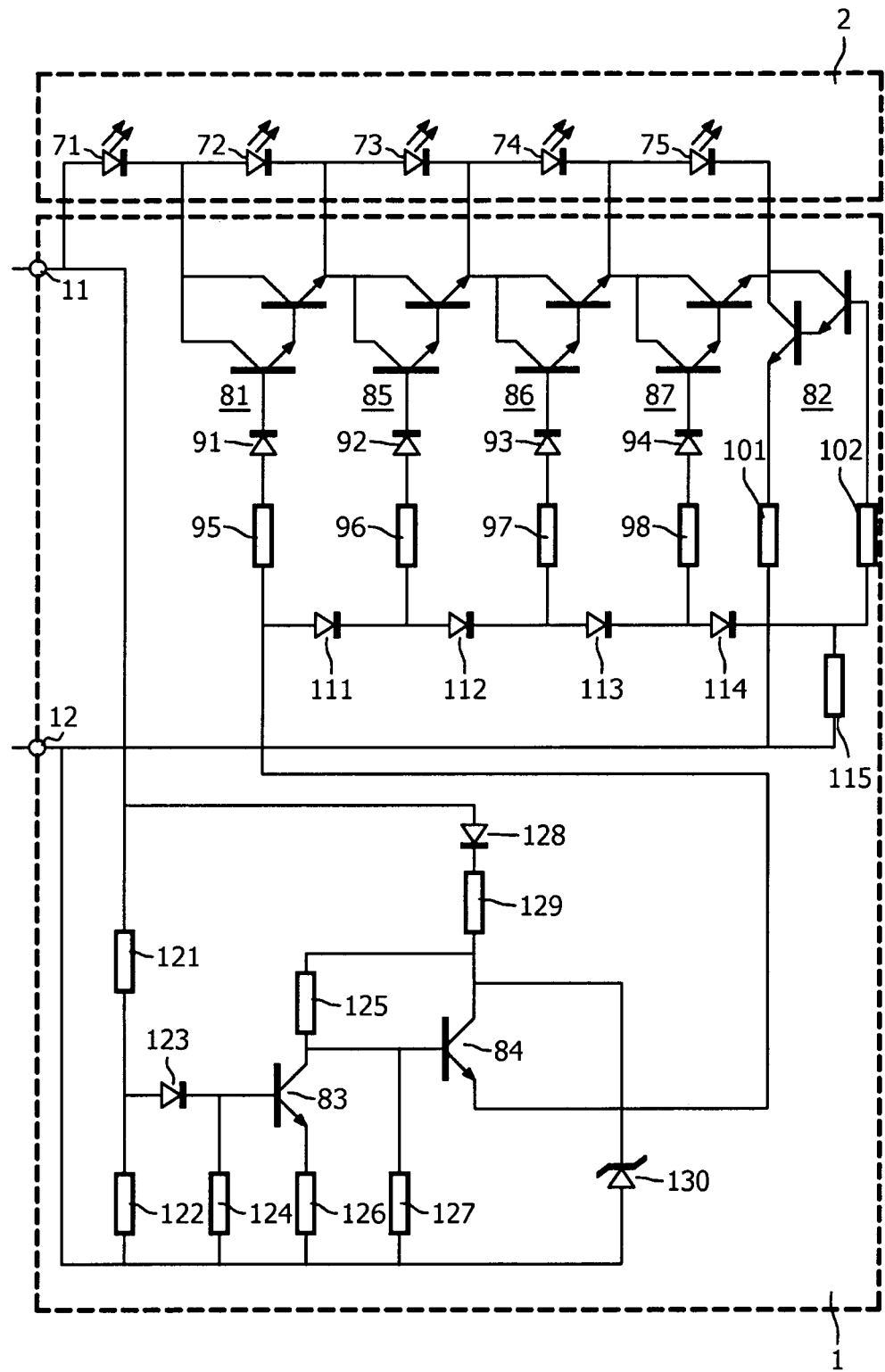
FIG. 4 shows a second embodiment of a driver circuit.

In the FIG. 4, a second embodiment of a driver circuit 1 for driving a load circuit 2 is shown. The driver circuit 1 for example comprises an input terminal 11 coupled to a positive side of a first light circuit 71 of the load circuit 2. Via the input terminal 11, an input voltage originating from a source not shown is supplied to a combination of the driver circuit 1 and the load circuit 2. A negative side of the first light circuit 71 is coupled to a positive side of a second light circuit 72 of the load circuit 2 and is coupled to a first main electrode of a Darlington configuration 81 of two transistors. A second main electrode of the Darlington configuration 81 is coupled to a negative side of the second light circuit 72 and to a positive side of a third light circuit 73 and to a first main electrode of a Darlington configuration 85. A second main electrode of the Darlington configuration 85 is coupled to a negative side of the third light circuit 73 and to a positive side of a fourth light circuit 74 and to a first main electrode of a Darlington configuration 86. A second main electrode of the Darlington configuration 86 is coupled to a negative side of the fourth light circuit 74 and to a positive side of a fifth light circuit 75 and to a first main electrode of a Darlington configuration 87. A second main electrode of the Darlington configuration 87 is coupled to a negative side of the fifth light circuit 75 and to a first main electrode of a Darlington configuration 82. A second main electrode of the Darlington configuration 82 is coupled via a resistor 101 to a ground terminal 12.

A control electrode of the Darlington configuration 82 is coupled via a resistor 102 and a resistor 115 to the ground terminal 12. A control electrode of the Darlington configuration 87 is coupled via a serial diode-resistor combination 94, 98 and a diode 114 to an interconnection between the resistors 102 and 115. A control electrode of the Darlington configuration 86 is coupled via a serial diode-resistor combination 93, 97 and a diode 113 to a serial diode-resistor combination 114, 115. A control electrode of the Darlington configuration 85 is coupled via a serial diode-resistor combination 92, 96 and a diode 112 and the diode 113 to the serial diode-resistor combination 114, 115. A control electrode of the Darlington configuration 81 is coupled via a serial diode-resistor combination 91, 95 and a diode 111 and the diodes 112, 113 to the serial diode-resistor combination 114, 115.

The input terminal 11 is coupled via a voltage divider 121, 122 to the ground terminal 12. An output of the voltage divider 121, 122 is coupled via a diode 123 to a control electrode of a transistor 83 and to one side of a resistor 124. The other side of this transistor 124 is coupled to the ground terminal 12. A first main electrode of the transistor 83 is coupled to one side of a resistor 125 and to a control electrode of a transistor 84 and to one side of a resistor 127. The other side of this transistor 127 is coupled to the ground terminal 12. A second main electrode of the transistor 83 is coupled via a resistor 126 to the ground terminal 12. A first main electrode of the transistor 84 is coupled to the other side of the resistor 125 and is coupled via a serial diode-resistor combination 128, 129 to the input terminal 11 and is coupled via a zener-diode 130 to the ground terminal 12. A second main electrode of the transistor 84 is coupled to a connection between the serial diode-resistor combination 91, 95 and the diode 111. Parallel to the zener-diode 130, a capacitor may be located for filtering purposes and/or for reducing light fluctuations.

Each light circuit for example comprises one or more light emitting diodes or one or more segments of a light emitting diode (group). The source not shown is for example an alternating-current voltage source coupled to a rectifier circuit and a capacitor circuit and a bleeder circuit. Each Darlington configuration may be replaced by a single transistor. Other transistors and other polarities and further circuits are not to be excluded. The capacitor circuit may be introduced for filtering purposes and/or for reducing light fluctuations.

This driver circuit 1 is in a first mode for the input voltage having a first voltage amplitude and is in a second mode for the input voltage having a second voltage amplitude larger than the first voltage amplitude and is in a third mode for the input voltage having a third voltage amplitude larger than the second voltage amplitude and is in a fourth mode for the input voltage having a fourth voltage amplitude larger than the third voltage amplitude and is in a fifth mode for the input voltage having a fifth voltage amplitude larger than the fourth voltage amplitude. In the first mode, only the first light circuit 71 is on (activated) and the others are off (de-activated), in the second mode, only the first and second light circuits 71 and 72 are on (activated) and the others are off (de-activated), in the third mode, the first and second and third light circuits 71-73 are on (activated) and the fourth and fifth light circuits 74 and 75 are off (de-activated), in the fourth mode the first and second and third and fourth light circuits 71-74 are on (activated) and the fifth light circuit 75 is off (de-activated), and in the fifth mode all light circuits 71-75 are on (activated).

A control circuit comprising the elements 81-87 controls an amplitude of a current flowing through at least the first light circuit 71 in dependence of the modes. Preferably, in the first mode, the current has a largest current amplitude. In the second mode this current amplitude is a bit smaller, in the third mode this current amplitude is yet smaller, and in the fourth mode this current amplitude is yet smaller. In the fifth mode, the current has a smallest current amplitude. Preferably, in the first mode, a light output of the first light circuit 71 is largest. In the second mode this light output is a bit smaller, in the third mode this light output is yet smaller, and in the fourth mode this light output is yet smaller. In the fifth mode, the light output is smallest. Most preferably, a total light output of all light circuits 71-75 is substantially constant during all modes.

The controlling circuit 82-84, 101, 121-130 allows in the first mode a current with a first current amplitude to flow through the first light circuit 71 and allows in the second mode a current with a second current amplitude to flow through the first and second light circuits 71, 72 etc. The controlling circuit 81, 85, 86, 87 is for short-circuiting or bridging the second and third and fourth and fifth light circuits 72-75 in the first mode. The controlling circuit 85, 86, 87 is for short-circuiting or bridging the third and fourth and fifth light circuits 73-75 in the second mode. The controlling circuit 86, 87 is for short-circuiting or bridging the fourth and fifth light circuits 74-75 in the third mode. The controlling circuit 87 is for short-circuiting or bridging the fifth light circuit 75 in the fourth mode. In the fifth mode, none of the light circuits 71-75 is short-circuited or bridged.

The Darlington configuration 82 forms together with the resistor 101 a current source, and the transistors 83 and 84 form, together with the elements 121-130, a current shaper.

Figure 5:
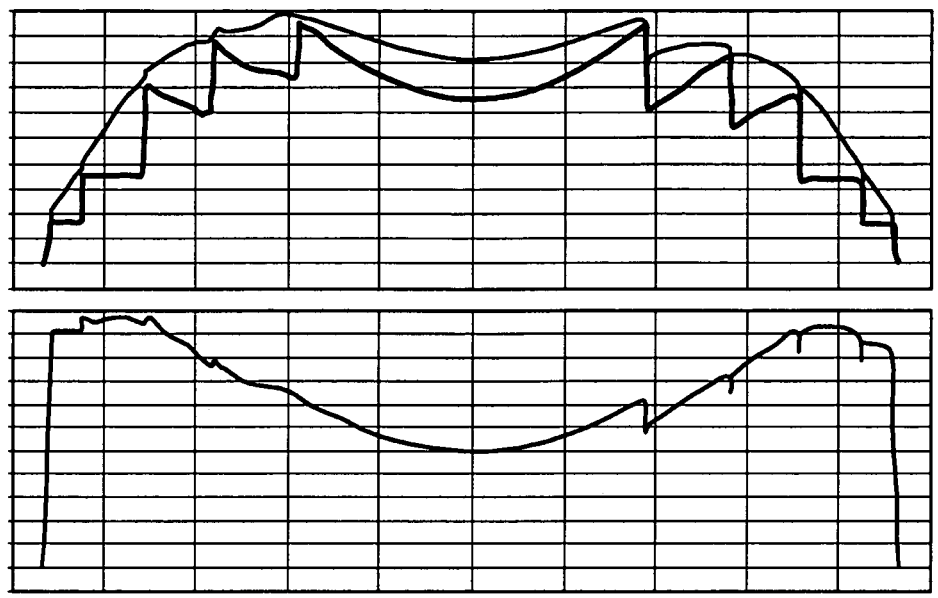
FIG. 5 shows third simulation results.

In the FIG. 5, third simulation results are shown. In the upper graph, the total input power (lighter line) and the power (darker line) of a string of light circuits 71-75 is shown for a first half of a cycle of a mains voltage. In the lower graph, the current flowing through the light circuit 71 of the string of light circuits 71-75 is shown for a first half of a cycle of a mains voltage.

Figure 6:
FIG. 6 shows fourth simulation results.

In the FIG. 6, fourth simulation results are shown, the total input power (lighter line) and the power (darker line) of the string of light circuits 71-75 for the driver circuit 1 and the load circuit 2 shown in the FIG. 4 when extended with a rectifier for rectifying a mains voltage and with an improved capacitor circuit for bridging voltage gaps and with a bleeder circuit. In that case, a flicker index of 8.53%, an efficiency of 76.5%, a power factor of 0.9 and a total harmonic distortion of 0.46 can be reached.

Figure 7:
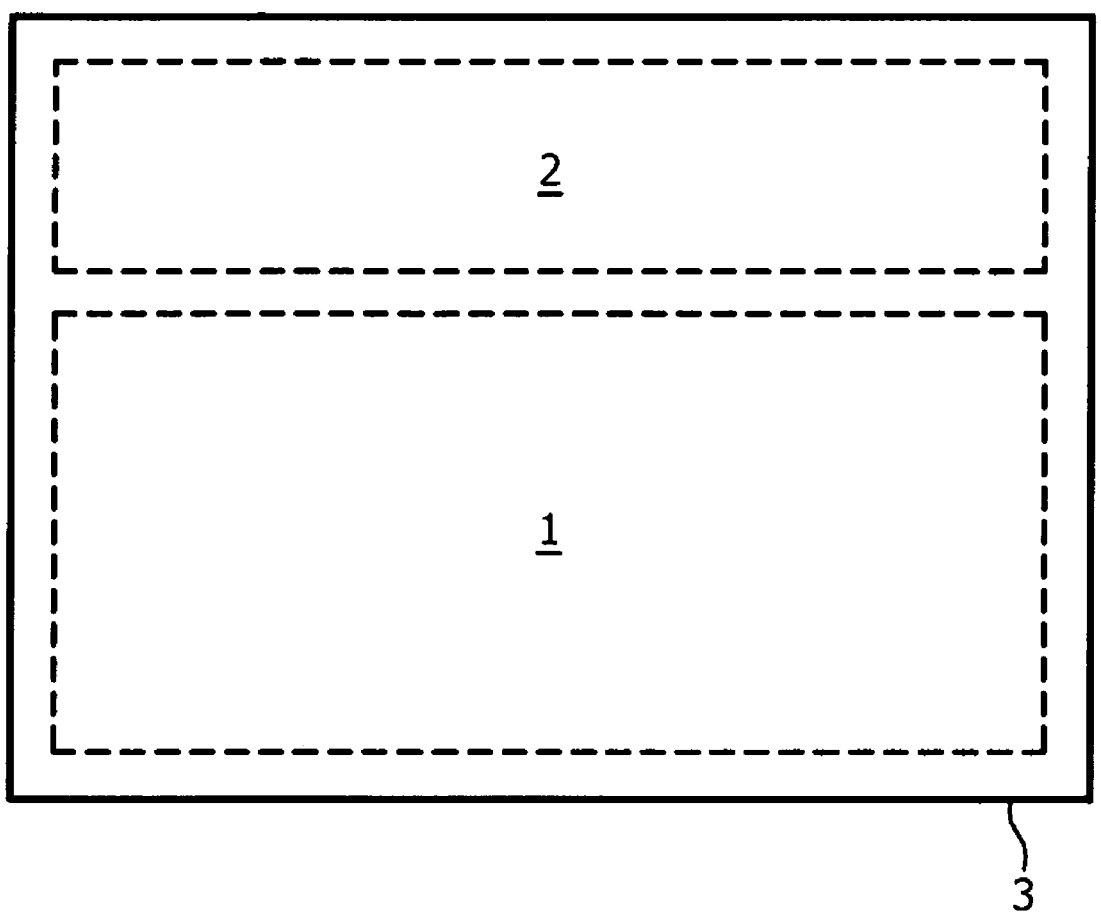
FIG. 7 shows a device.

In the FIG. 7, a device 3 is shown comprising the driver circuit 1 and the load circuit 2.

Summarizing, driver circuits 1 for driving load circuits 2 comprising first and second light circuits 21-22, 71-72 are in first/second modes for input voltages having first/second voltage amplitudes, the second voltage amplitudes being larger than the first voltage amplitudes. The first light circuits 21, 71 are on in the first and second modes. The second light circuits 22, 72 are off in the first modes and are on in the second modes. A control circuit 31-34, 41, 42, 81-84, 101, 121-130 controls amplitudes of currents flowing through at least the first light circuit 21, 71 in dependence of the modes to extend control. These currents may get smaller current amplitudes in higher modes. Light outputs of the first light circuit 21, 71 may get smaller in higher modes. A total light output of all light circuits 21-22, 71-72 may remain substantially constant during all modes.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein different parts of the different disclosed embodiments are combined into a new embodiment.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A driver circuit for driving a load circuit, the load circuit comprising a first light circuit and a second light circuit, the driver circuit being in a first mode for an input voltage having a first voltage amplitude, the driver circuit being in a second mode for the input voltage having a second voltage amplitude larger than the first voltage amplitude, the first light circuit being activated in the first mode and being activated in the second mode, the second light circuit being de-activated in the first mode and being activated in the second mode, the driver circuit comprising a control circuit for controlling an amplitude of a current flowing through at least the first light circuit in dependence of the first and second modes, wherein the current in the first mode has a first current amplitude and the current in the second mode has a second current amplitude smaller than the first current amplitude.

2. The driver circuit of claim 1, the first light circuit in the first mode having a first light output and the first light circuit in the second mode having a second light output smaller than the first light output.

3. The driver circuit of claim 1, the control circuit comprising
a first controlling circuit for in the first mode allowing the current with the first current amplitude to flow through the first light circuit, the first controlling circuit being de-activated in the second mode, and
a second controlling circuit for in the second mode allowing the current with the second current amplitude to flow through the first and second light circuits, the second controlling circuit being de-activated in the first mode.

4. The driver circuit of claim 3, further comprising a dimming circuit coupled to the first and second controlling circuits via resistors for dimming the activated light circuits.

5. The driver circuit of claim 1, the control circuit comprising
a third controlling circuit for in the first mode allowing the current with the first current amplitude to flow through the first light circuit and for in the second mode allowing the current with the second current amplitude to flow through the first and second light circuits, and
a fourth controlling circuit for short-circuiting the second light circuit in the first mode.

6. The driver circuit of claim 5, the third controlling circuit comprising a current source and a current shaper coupled to each other.

7. The driver circuit of claim 1, the load circuit further comprising a third light circuit, the driver circuit being in a third mode for the input voltage having a third voltage amplitude larger than the first and second voltage amplitudes, the first light circuit being activated in the third mode, the second light circuit being activated in the third mode, the third light circuit being de-activated in the first and second modes and being activated in the third mode, and the control circuit being arranged for controlling an amplitude of a further current flowing through at least the first and second light circuits in dependence of the second and third modes.

8. The driver circuit of claim 7, the further current in the second mode having a third current amplitude and the further current in the third mode having a fourth current amplitude smaller than the third current amplitude.

9. The driver circuit of claim 8, the first light circuit in the second mode having a third light output and the first light circuit in the third mode having a fourth light output smaller than the third light output.

10. A driver circuit for driving a load circuit, the load circuit comprising a first light circuit and a second light circuit, the driver circuit being in a first mode for an input voltage having a first voltage amplitude, the driver circuit being in a second mode for the input voltage having a second voltage amplitude larger that the first voltage amplitude, the first light circuit being activated in the first mode and being activated in the second mode, the second light circuit being de-activated in the first mode and being activated in the second mode, the driver circuit comprising
a control circuit for controlling an amplitude of a current flowing through at least the first light circuit in dependence of the first and second modes,
wherein a total light output of all light circuits in the first mode is substantially the same as a total light output of all light circuits in the second mode.

11. A method for driving a load circuit via a driver circuit, the load circuit comprising a first light circuit and a second light circuit, the driver circuit being in a first mode for an input voltage having a first voltage amplitude, the driver circuit being in a second mode for the input voltage having a second voltage amplitude larger than the first voltage amplitude, the first light circuit being activated in the first mode and being activated in the second mode, the second light circuit being de-activated in the first mode and being activated in the second mode, the method comprising controlling an amplitude of a current flowing through at least the first light circuit in dependence of the first and second modes, wherein the current in the first mode has a first current amplitude and the current in the second mode has a second current amplitude smaller than the first current amplitude.

12. The driver circuit of claim 1, wherein the first current amplitude and the second current amplitude have a relationship such that a light emitted by the first light circuit in the first mode is substantially the same as a total light emitted by the first and second light circuits in the second mode.

13. The driver circuit of claim 2, wherein the second light circuit in the second mode has a third light output, and wherein the first light output in the first mode is substantially the same as a total of the second light output and the third light output.

14. The driver circuit of claim 9, wherein the second light circuit in the second mode has a fifth light output and the second light circuit in the third mode has a sixth light output smaller than the fifth light output.

15. The driver circuit of claim 10, further comprising a dimming circuit coupled to the first and second controlling circuits via resistors for dimming the activated light circuits.

16. The driver circuit of claim 10, wherein the load circuit further comprises a third light circuit, the driver circuit being in a third mode for the input voltage having a third voltage amplitude larger than the first and second voltage amplitudes, the first light circuit being activated in the third mode, the second light circuit being activated in the third mode, the third light circuit being de-activated in the first and second modes and being activated in the third mode, and the control circuit being arranged for controlling an amplitude of a further current flowing through at least the first and second light circuits in dependence of the second and third modes.

17. The driver circuit of claim 16, wherein a total light output of all light circuits in the third mode is substantially the same as the total light output of all light circuits in the first mode and the total light output of all light circuits in the second mode.

18. The method claim 11, wherein the load circuit further comprises a third light circuit and the driver circuit being in a third mode for the input voltage having a third voltage amplitude larger than the first and second voltage amplitudes, the first light circuit being activated in the third mode, the second light circuit being activated in the third mode, the third light circuit being de-activated in the first and second modes and being activated in the third mode, and the control circuit being arranged for controlling an amplitude of a further current flowing through at least the first and second light circuits in dependence of the second and third modes, the method further comprising controlling the amplitude of the current flowing through at least the first light circuit in dependence of the third mode, wherein the current flowing through at least the first light circuit in the third mode has a third current amplitude which is smaller than the second current amplitude.

19. The method of claim 18, wherein a total light output of all light circuits in the third mode is substantially the same as the total light output of all light circuits in the first mode and the total light output of all light circuits in the second mode.

20. The method of claim 11, wherein a total light output of all light circuits in the first mode is substantially the same as a total light output of all light circuits in the second mode.

* * * * *